United States Patent
Raghuram et al.

(10) Patent No.: US 10,698,696 B2
(45) Date of Patent: Jun. 30, 2020

(54) CHIPSET FUSE PROGRAMMING SYSTEM

(71) Applicant: Dell Products L.P., Round Rock, TX (US)

(72) Inventors: Jayanth Raghuram, Round Rock, TX (US); Rui Shi, Cedar Park, TX (US); Ching-Lung Chao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 144 days.

(21) Appl. No.: 15/910,831

(22) Filed: Mar. 2, 2018

(65) Prior Publication Data
US 2019/0272176 A1    Sep. 5, 2019

(51) Int. Cl.
*G06F 9/44*    (2018.01)
*G06F 9/4401*  (2018.01)
*G06F 1/24*    (2006.01)

(52) U.S. Cl.
CPC .............. *G06F 9/441* (2013.01); *G06F 1/24* (2013.01)

(58) Field of Classification Search
None
See application file for complete search history.

(56) References Cited

U.S. PATENT DOCUMENTS

| | | | | |
|---|---|---|---|---|
| 6,425,079 | B1 * | 7/2002 | Mahmoud | G06F 9/4411 710/62 |
| 6,754,726 | B1 * | 6/2004 | Kuo | G06F 13/4027 710/305 |
| 10,003,467 | B1 * | 6/2018 | Miller | H04L 9/3268 |
| 2006/0020844 | A1 * | 1/2006 | Gibbons | G06F 11/1417 714/2 |
| 2006/0202232 | A1 * | 9/2006 | Takami | G11C 7/24 257/209 |
| 2011/0125996 | A1 * | 5/2011 | Gattegno | G06F 9/4401 713/2 |
| 2017/0052799 | A1 * | 2/2017 | Steedman | G06F 15/7807 |
| 2018/0024960 | A1 * | 1/2018 | Wagh | G06F 3/0631 710/313 |
| 2019/0007310 | A1 * | 1/2019 | Das Sharma | H04L 45/52 |

* cited by examiner

*Primary Examiner* — Danny Chan
(74) *Attorney, Agent, or Firm* — Haynes and Boone, LLP

(57) ABSTRACT

A chipset fuse programming system includes a chassis that houses a chipset with programmable fuses and a Basic Input/Output System (BIOS) that is coupled to the chipset. The BIOS includes a BIOS storage storing fuse configuration profiles. The BIOS determines a chipset type of the chipset and selects a first fuse configuration profile based on the chipset type. The BIOS then programs the programmable fuses included in the chipset using the first fuse configuration profile. A central processing system may be housed in the chassis and coupled to the BIOS, with the BIOS determining a central processing system type of the central processing system, and selecting the first fuse configuration profile based on a combination of the chipset type and the central processing system type.

20 Claims, 5 Drawing Sheets

400

BIOS DETERMINES CONFIGURATION OF COMPUTING DEVICE
402

↓

BIOS SELECTS A 1ST FUSE CONFIGURATION PROFILE FROM A PLURALITY OF FUSE CONFIGURTION PROFILES BASED ON THE CONFIGURATION OF THE COMPUTING DEVICE
404

↓

BIOS PROGRAMS CHIPSET FUSES USING THE 1ST FUSE CONFIGURATION PROFILE
406

CHIPSET FUSE PROGRAMMING SYSTEM

BACKGROUND

The present disclosure relates generally to information handling systems, and more particularly to programming fuses in chipsets used in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include chipsets such as, for example, the Platform Controller Hub (PCH) available from INTEL® Corporation of Santa Clara, Calif., United States. Such chipsets may include One-Time-Programmable (OTP) Non-Volatile Memory (NVM) and/or other memory subsystems that utilize fuses such as In Field Programmable (IFP) fuses that may be burned during manufacture to provide security information in the chipset (e.g., information associated with a public key such as a hash of a master public key) and/or enable particular features in the system. For example, security information provided in the chipset in such a manner and associated with a public key may be utilized to verify software or firmware (e.g., a Basic Input/Output System (BIOS)) that has been signed with an associated private key. Similarly, features enabled in the information handling system in such a manner may include security features such as, for example, BOOT GUARD available in systems provided by DELL® Inc. of Round Rock, Tex., United States, and PLATFORM TRUST TECHNOLOGY available from INTEL® corporation of Santa Clara, Calif., United States. Providing chipsets with information and enabling system features in such manner provides a root of trust for that information and those features.

Conventional systems provide two methods for programming IFP fuses during manufacture: Automatic End Of Manufacturing (Auto EOM) and Host Embedded Controller Interface (HECI) EOM. Auto EOM provides for the burning of fuses in the chipset automatically upon the initial boot of the system and before the BIOS begins executing. As such, Auto EOM cannot be controlled by the BIOS or any software tool or script. HECI EOM provides for the burning of the fuses in response to a command provided post-boot (e.g., using an SPSManuf Universally Extensible Firmware Interface (UEFI) shell tool or executable version that can be run in an operating system.) Neither of Auto EOM or HECI EOM differentiates between the chipset (e.g., the PCH) or the Central Processing Unit (CPU) installed in the system, which can raise some issues. For example, each of PCH and CPU may be provided in different versions (e.g., a production version (also referred to as a Qualification Sample (QS)) or a pre-production version (also referred to as an Engineering Sample (ES)). The IFP fuse burn operations may differ based on the combination of the PCH and the CPU utilized in a system, and conventional BIOS storage only stores a single set of IFP fuse burn instructions. As such, a manufacturer must determine and provide the appropriate IFP fuse burn instructions in the BIOS storage for use in the IFP fuse burning process, and risks rendering the system unusable (e.g., "bricked") if the wrong IFP fuse burn profile is utilized.

Accordingly, it would be desirable to provide an improved chipset fuse programming system.

SUMMARY

According to one embodiment, an Information Handling System (IHS) includes a processing subsystem; and a memory subsystem that is coupled to the processing subsystem and that includes instructions that, when executed by the processing subsystem, causes the processing subsystem to provide a Basic Input/Output System (BIOS) that is configured to: determine a chipset type of a chipset that is coupled to the BIOS; select, based on the chipset type of the chipset, a first fuse configuration profile of a plurality of fuse configuration profiles that are included in a BIOS storage; and program, using the first fuse configuration profile, a plurality of programmable fuses that are included in the chipset.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
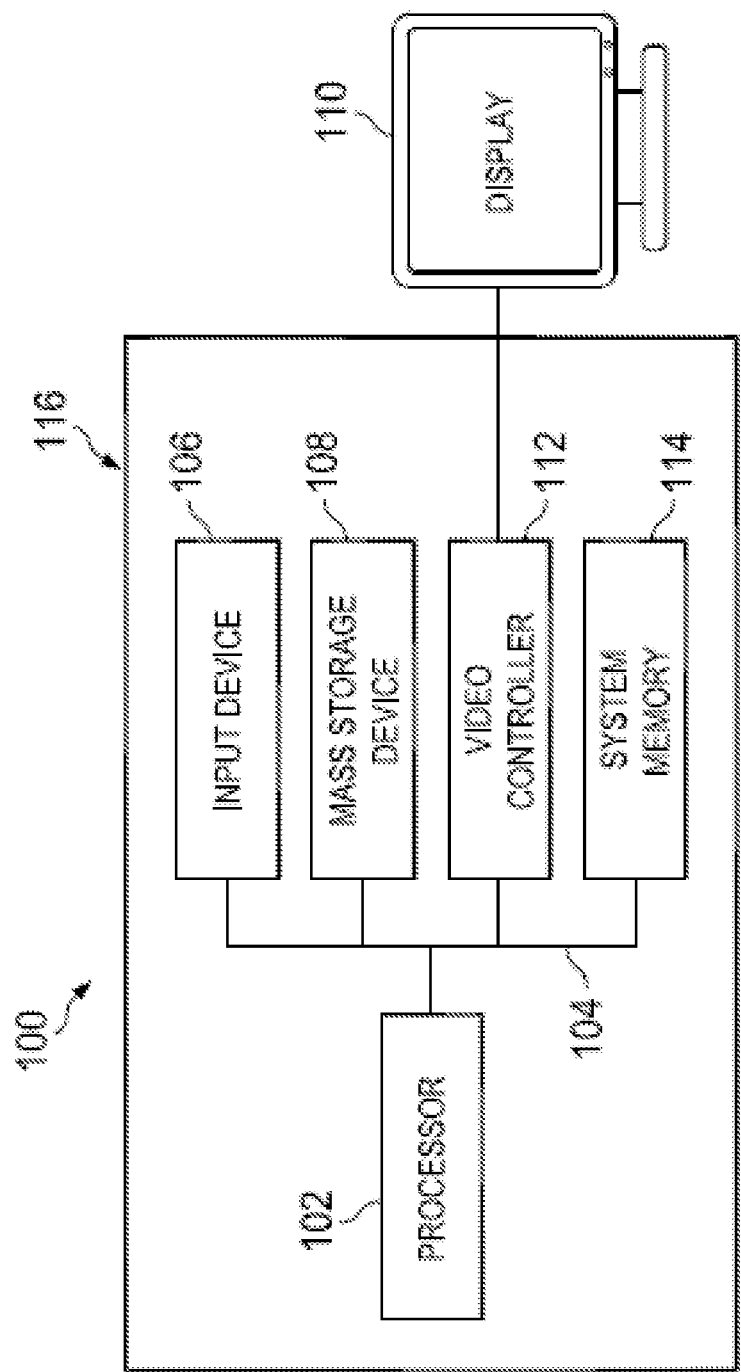
FIG. 1 is a schematic view illustrating an embodiment of an Information Handling System.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
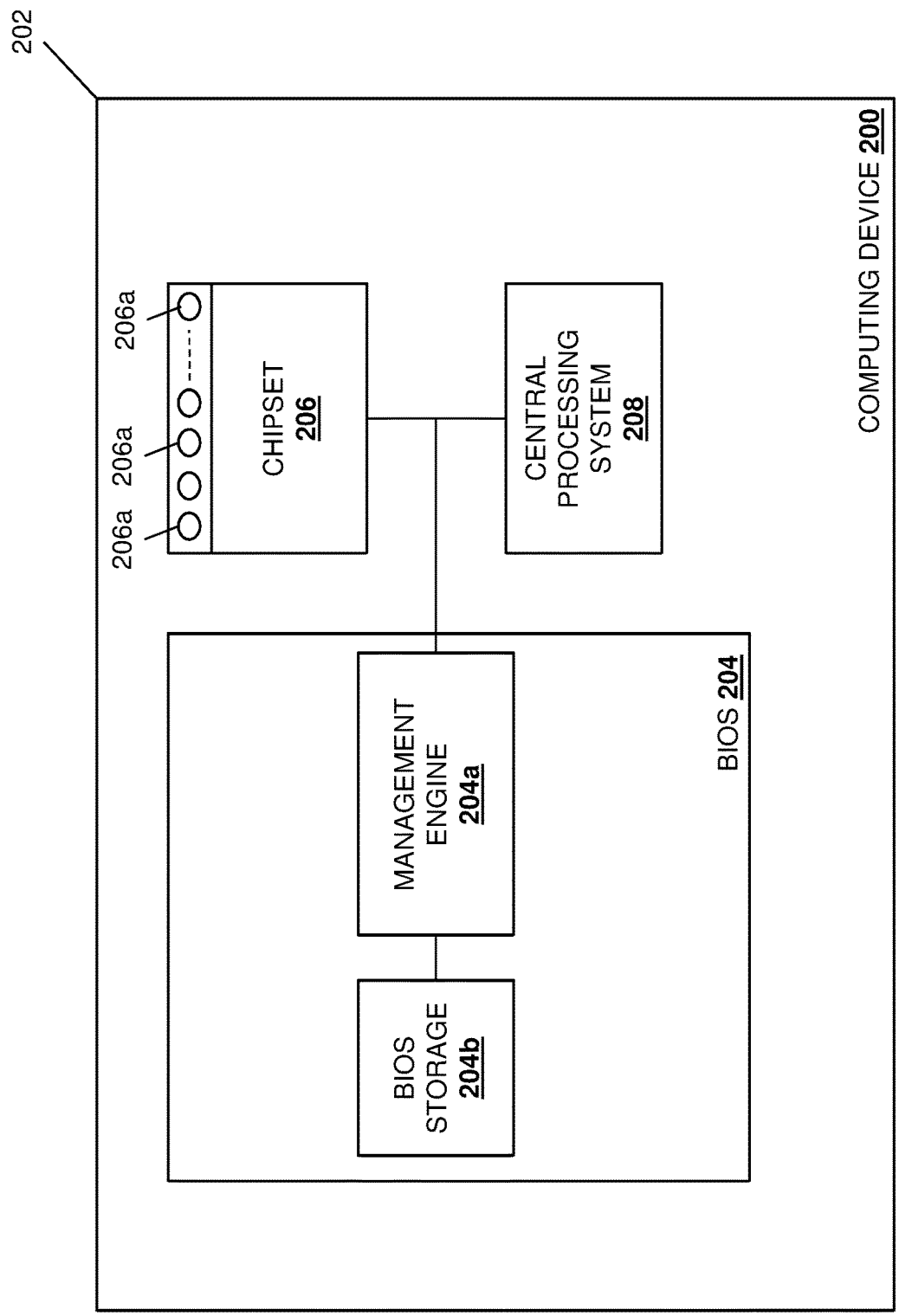
FIG. 2 is a schematic view illustrating an embodiment of a computing device including a Basic Input/Output System (BIOS).

Referring now to FIG. 2, an embodiment of a computing device 200 is illustrated that may be provided by the IHS 100 discussed above with reference to FIG. 1, and/or may include some or all of the components of the IHS 100. In specific embodiments, the computing device 200 may be a server device, a desktop computing device, a laptop/notebook computing device, a tablet computing device, a mobile phone, and/or a variety of other computing devices that would be apparent to one of skill in the art in possession of the present disclosure. In the illustrated embodiment, the computing device 200 includes a chassis 202 that houses the components of the computing device 200, only some of which are illustrated in FIG. 2. For example, the chassis 202 may house a BIOS processing subsystem (not illustrated, but which may include the processor 102 discussed above with reference to FIG. 1) and a BIOS memory subsystem (not illustrated, but which may include the memory 114 discussed above with reference to FIG. 1) that includes instructions that, when executed by the BIOS processing subsystem, cause the BIOS processing subsystem to provide a Basic Input/Output System (BIOS) 204 that is configured to perform the functions of the BIOS and/or computing devices discussed below.

As would be appreciated by one of skill in the art in possession of the present disclosure, the BIOS may be provided by non-volatile firmware (e.g., provided by the combination of the BIOS processing subsystem and BIOS memory subsystem discussed above) that is configured to perform hardware initialization during a booting process of the computing device 200, as well as provide runtime services for operating systems and/or other programs/applications executed on the computing device 200. While referred to as a "BIOS", one of skill in the art in possession of the present disclosure will recognize that the BIOS 204 may be provided according to the Unified Extensible Firmware Interface (UEFI) specification and, as such, may include or be coupled to a software interface between an operating system provided by the computing device 200 and platform firmware included in the computing device 200. Thus, the BIOS 204 may be provided by UEFI firmware that may include, for example, legacy support for BIOS services, while remaining within the scope of the present disclosure as well.

In the illustrated embodiment, the BIOS 204 includes a management engine 204a that may be provided, for example, by the BIOS processing subsystem discussed above via the execution of instructions included on the BIOS memory subsystem discussed above. One of skill in the art in possession of the present disclosure will recognize that the management engine 204a is illustrated and described herein as provided the chipset fuse programming functionality of the present disclosure, and that the BIOS 204 may perform a variety of other BIOS functionality while remaining within the scope of the present disclosure. The BIOS 204 also includes a BIOS storage 204b that is coupled to the management engine 204a (e.g., via a coupling between the BIOS storage 204b and the BIOS processing subsystem), and that may store any of the information utilized as discussed below (e.g., the fuse configuration profiles and/or any other BIOS information that would be apparent to one of skill in the art in possession of the present disclosure.) For example, the BIOS storage 204b may be provided by a BIOS Serial Peripheral Interface (SPI) flash storage device, although other storage subsystems will fall within the scope of the present disclosure as well.

The chassis 202 may also house a chipset 206 that is coupled to the management engine 204a in the BIOS 204 (e.g., via a coupling between the BIOS processing subsystem and the chipset 206.) In the embodiments discussed below, the chipset 206 is a Platform Controller Hub (PCH) available from INTEL® corporation of Santa Clara, Calif., United States, although other chipsets and/or combinations of electronic components that manage data flow between a central processing system, memory system, and peripherals in the computing device 200, may benefit from the teachings of the present disclosure and thus are envisioned as falling within its scope as well. As illustrated, the chipset 206 includes a plurality of programmable fuses 206a. For example, the programmable fuses 206a may be provided by Programmable Read-Only Memory (PROM) that is part of the chipset 206 and that may include One-Time Programmable Non-Volatile Memory (OTP NVM) in which settings of each bit may be locked via programming of the programmable fuses 206a (e.g., which may be provided by fuses, anti-fuses, etc.), although one of skill in the art in possession of the present disclosure will appreciate that other OTP memory, fuses, and/or other components will fall within the scope of the present disclosure as well. In the examples provided below, any of the programmable fuses 206a are "burnt" (e.g., the programmable fuses are melted, blown, or otherwise programmed) to provide cells that either indicate a "0" or a "1". However, one of skill in the art in possession of the present disclosure will recognize that one-time-programmable fuses may be programmed in other manners while remaining within the scope of the present disclosure.

The chassis 202 may also house a central processing system 208 or Central Processing Unit (CPU) that is coupled to the management engine 204a in the BIOS 204 (e.g., via a coupling between the BIOS processing subsystem and the central processing system 208.) While a specific computing device 200 has been illustrated and described, one of skill in the art in possession of the present disclosure will recognize that computing devices may include a variety of different components and/or component configurations that enable the performance of conventional computing device functionality, as well as the functionality discussed below, while remaining within the scope of the present disclosure.

Figure 3:
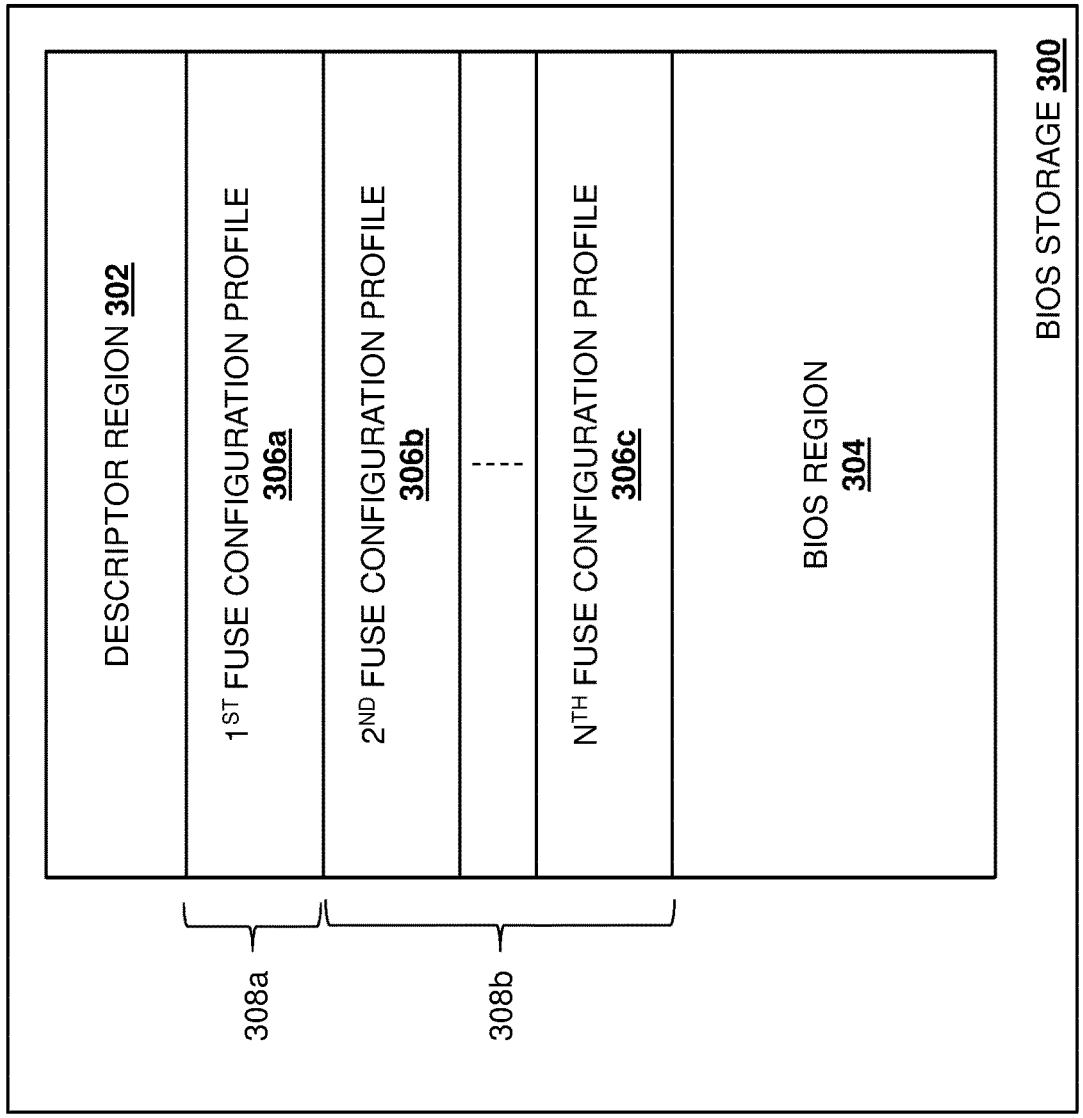
FIG. 3 is a schematic view illustrating an embodiment of a BIOS storage that may be provided in the BIOS of FIG. 2.

Referring now to FIG. 3, an embodiment of a BIOS storage 300 is illustrated that may be the BIOS storage 204b discussed above with reference to FIG. 2. As such, one of skill in the art will recognize that the BIOS storage 300 may be provided by a BIOS SPI flash storage device in many of the embodiments discussed below. In the illustrated embodiment, the BIOS storage 300 includes a descriptor region 302 and a BIOS region 304. For example, the descriptor region 302 may be a flash descriptor region, and one of skill in the art in possession of the present disclosure will recognize that conventional BIOS SPI flash requires the flash descriptor region 302 and the BIOS region 304, with the flash descriptor region 302 located first in the BIOS storage 300, and the BIOS region 304 located last (e.g., in the last 4 GB-32 MB of memory address space) in the BIOS storage 300. The flash descriptor region 302 may be provided with configuration data that defines access rights for different devices that can access the BIOS SPI flash, while the BIOS region 304 may be provided with information for operating the BIOS 204.

In addition, the BIOS storage 300 includes a plurality of fuse configuration profiles such as the first fuse configuration profile 306a, the second fuse configuration profile 306b, and up to the Nth fuse configuration profile 306c illustrated in FIG. 3. In the illustrated embodiment, the first fuse configuration profile 306a is located in a first fuse configuration profile region 308a of the BIOS storage 300, while the second fuse configuration profile 306b through the Nth fuse configuration profile 306c are located in a second fuse configuration profile region 308b of the BIOS storage 300. For example, the first fuse configuration profile region 308a may be a default fuse configuration profile region that is used by the management engine 204a to retrieve information for use in programming chipset fuses, and the first fuse configuration profile 306a may be a default fuse configuration profile that is provided in the BIOS storage 300 for programming chipset fuses for a first/default computing device configuration (e.g., a particular type of chipset and, in some embodiments, combinations of particular types of chipsets, CPUs, and/or other computing device components.) Furthermore, the second fuse configuration profile 306b through the Nth fuse configuration profile 306c may be fuse configuration profiles that are each provided in the BIOS storage 300 for programming chipset fuses for other computing device configurations that are each different from the first/default computing device configuration and each other (e.g., particular types of chipset and, in some embodiments, combinations of particular types of chipsets, CPUs, and/or other computing device components.) As discussed below, in some embodiments, the management engine 204a may be configured to program chipset fuses with any fuse configuration profile that is located in the first/default fuse configuration profile region 308a, and thus the BIOS 204 may operate determine the one of the plurality of fuse configuration profiles 306a-c that is appropriate for the configuration of the computing device 200, and ensure that fuse configuration profile is located in the first/default fuse configuration profile region 308a prior to chipset fuse programming operations by the management engine 204a.

In a specific example, the fuse configuration profiles may each be provided by a management engine eXtensible Markup Language (XML) settings file that are included in separate management engine flash images (e.g., the first fuse configuration profile 306a may be provided by a first management engine XML settings file included in a first management engine flash image, the second fuse configuration profile 306b may be provided by a second management engine XML settings file included in a second management engine flash image, and the Nth fuse configuration profile 306c may be provided by an Nth management engine XML settings file included in an Nth management engine flash image.) As such, management engine XML settings files may be configured with different fuse programming instructions, associated management engine/fuse configuration profile regions may be created in the BIOS storage 300 based on each management engine XML settings file (e.g., using a Server Platform Services (SPS) Firmware Image Tool Creation (FITC) build time tool), the BIOS SPI flash image may be created that contains the management engine flash images with the management engine XML settings files, and the BIOS SPI flash image may be loaded into the BIOS SPI flash storage device during the manufacturing process of the computing device 200. While a specific BIOS storage (and method for providing that BIOS storage) has been described, one of skill in the art in possession of the present disclosure will recognize that the plurality of fuse configuration profiles may be provided such that they are accessible to the BIOS 204 and/or management engine 204a in a variety of manners that will fall within the scope of the present disclosure as well.

Figure 4:
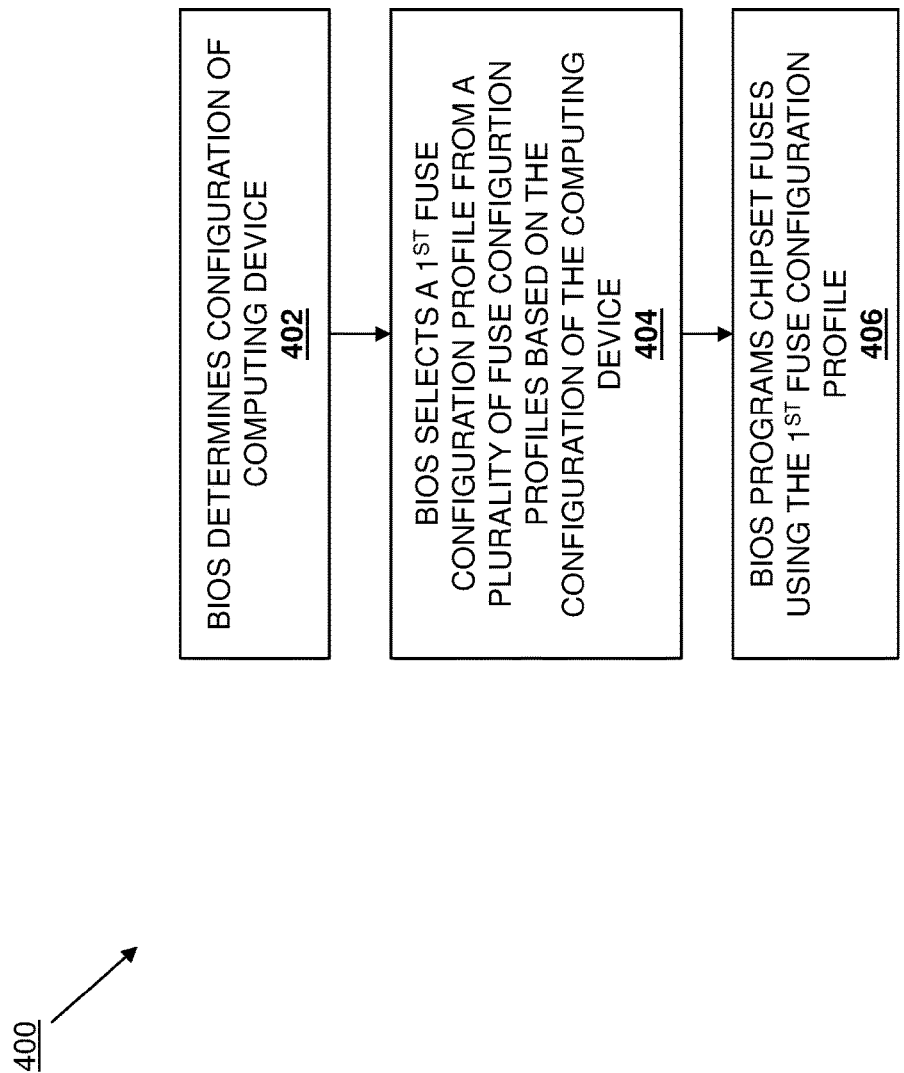
FIG. 4 is a flow chart illustrating an embodiment of a method for chipset fuse programming.

Referring now to FIG. 4, an embodiment of a method 400 for programming chipset fuses is illustrated. As discussed above, the systems and methods of the present disclosure provide a BIOS that detects the configuration of a computing device in order to select a fuse configuration profile for programming chipset fuses. For example, the BIOS may detect a PCH type of a PCH in the computing device, and a CPU type of a CPU in the computing device, and select a fuse configuration profile (from a plurality of fuse configuration profiles in a BIOS storage) that provides for the programming of fuses in the PCH based on that combination of PCH type and CPU type. As discussed below, such systems and methods may provide for End of Manufacturing (EOM) operations that use Host Embedded Controller Interface (HECI) EOM commands issued by the BIOS/management engine at Power On Self Test (POST) during a first boot of the computing device, and which are based on the types of PCH and CPU included in the computing device, rather than performing EOM prior to BIOS execution (e.g., conventional Auto EOM), in UEFI shells, or via the operating system (e.g., via an SPSManuf tool), as is done in conventional chipset fuse programming systems.

One of skill in the art in possession of the present disclosure will recognize that the systems and methods of the present disclosure prevent the disablement (e.g., "bricking") of the motherboard in the computing device due to incorrect programming of OTP fuses in the PCH, and instead provide a BIOS-based control of the EOM process that operates similarly to Auto EOM but with enhanced runtime control via BIOS code. Furthermore the systems and methods of the present disclosure allow for a single version of the BIOS image to be used with different motherboards in computing devices that may include different combinations of PCH types and CPU types, which eliminates the need to provide different BIOS versions, eliminates issues resulting from human error, and eliminates the need for human intervention during the EOM process. These benefits are realized, at least in part, via the provisioning in the SPI BIOS flash storage of respective fuse configuration profiles for a variety of different PCH/CPU type combinations. One of skill in the art in possession of the present disclosure will recognize that the systems and methods of the present disclosure may provide for build time control of HECI EOM operations for any platform, and that control may be enabled or disabled on desired platforms. As such, production costs are reduced, time is saved, and supply chains are simplified, increasing the efficiency of the computing device manufacturing process.

The method 400 begins at block 402 where a BIOS determines a configuration of a computing device. As discussed above, prior to the method 400 and during a manufacturing process, the BIOS storage 204b/300 (e.g., a BIOS SPI flash storage device) is provided with a BIOS SPI flash image that includes different fuse configuration profiles 306a-c that each define a different fuse burn configuration for the programmable fuses 206a in the chipset 206, with a first/default fuse configuration profile 306a in a first fuse configuration profile region 308a, and second through Nth fuse configuration profiles in a second fuse configuration profile region 308b. As described herein, that BIOS SPI flash image may be provided on any computing device/platform irrespective of the chipset/PCH, central processing system/CPU, and/or other configuration details of the computing device/platform. In an embodiment, at block 402 and during a BIOS POST process, the management engine 204a in the BIOS 204 operates to determine the configuration of the computing device 200.

In some embodiments of block 402, the BIOS 204 may operate to determine a chipset type of the chipset 206. For example, the BIOS 204 may perform a runtime EOM function that provides for the determination of a PCH type of a PCH chipset by, for example, reading Memory Mapped Input Output (MMIO) chipset registers (e.g., for LEWISBURG® PCH chipsets available from INTEL® corporation, the register located at the address (0xFED300000+0x200) and INTEL® vendor identifier at the address (0xFED30000+0x110) as defined in the PCH chipset specification). In a specific example, a PCH chipset may be a production PCH chipset type (also referred to a Qualification Sample (QS) PCH), a pre-production PCH chipset type (also referred to as an Engineering Sample (ES) PCH), and/or any other PCH chipset type that would be apparent to one of skill in the art in possession of the present disclosure, and at block 402 the management engine 204a operates to detect that PCH chipset type. In some embodiments of block 402, the BIOS 204 may operate to determine a central processing system type of the central processing system 208. For example, the management engine 204a may perform a runtime EOM function that provides for the determination of a CPU type of a CPU by, for example, reading the appropriate CPU Model Specific Register (CPU MSR) (e.g., for INTEL® SKYLAKE® CPUs, the MSR is 0xCE, with bit 27 of that register including a 1 for pre-production/sample CPUs, and a 0 for production CPUs). In a specific example, a CPU may be a production CPU type (also referred to a Qualification Sample (QS) CPU), a pre-production CPU type (also referred to as an Engineering Sample (ES) CPU), and/or any other CPU type that would be apparent to one of skill in the art in possession of the present disclosure, and at block 402 the BIOS 204 operates to detect that CPU type. In many embodiments, the configuration of the computing device 200 that is determined at block 402 includes the combination of the PCH type and CPU type. However, one of skill in the art in possession of the present disclosure will recognize that any other configuration details of the computing device 200 that would effect, dictate, or otherwise define the programming of the programmable fuses 206a in the chipset 206 may be detected at block 402 while remaining within the scope of the present disclosure.

In some embodiments of block 402, the BIOS 204 may (e.g., according to the runtime EOM function) determine a current state of the programmable fuses 206a in the chipset 206 to determine, for example, whether the programmable fuses 206a have already been programmed (e.g., the fuses have already been burnt, blown, or otherwise configured). If the programmable fuses 206a in the chipset 206 have already been programmed, the management engine 204a may determine that the chipset 206 has already been programmed, and the method 400 may end.

The method then proceeds to block 404 where the BIOS selects a first fuse configuration profile from a plurality of fuse configuration profiles based on the configuration of the computing device. In an embodiment, at block 404 and during the BIOS POST process, the BIOS 204 selects one of the fuse configuration profiles 306a-c in the BIOS storage 204b/300 based on the PCH type, the CPU type, and/or any other configuration details of the computing device 200 that were determined at block 402. As discussed above, the values required for the programmable fuses 206a in the chipset/PCH 206 depend on the configuration of the computing device 200 and, in a specific example, on the combination of the type of PCH and CPU utilized in the computing device 200. For example, the computing device 200 may include different combinations of production and pre-production PCHs and CPUs (e.g., a production PCH/production CPU combination, a pre-production PCH/production CPU combination, a production PCH/pre-production CPU combination, or a pre-production PCH/pre-production CPU combination), and one of skill in the art in possession of the present disclosure will recognize that incorrect values provided in the programmable fuses 206a in the chipset/PCH 206 for any particular combination of PCH and/or CPU can effect operation of the computing device 200.

For example, in an experimental embodiment, a production BOOT GUARD fuse configuration profile was configured to enable BOOT GUARD (available in systems provided by DELL® Inc. of Round Rock, Tex., United States) on computing devices that included a production type Authenticated Code Module (ACM) available from INTEL® corporation of Santa Clara, Calif., United States. In computing devices having a production PCH/production CPU combination, the production BOOT GUARD fuse configuration profile rendered the computing device operational. However, in computing devices having a pre-production PCH/pre-production CPU combination or a production PCH/pre-production CPU combination, the production BOOT GUARD fuse configuration profile rendered the computing device unusable (e.g., "bricked"). Furthermore, in computing devices having a production PCH/pre-production CPU combination, the production BOOT GUARD fuse configuration profile rendered the computing device unusable until the pre-production CPU was replaced with a production CPU. As such, one of skill in the art in possession of the present disclosure will appreciate that the correct fuse configuration profiles and/or programming of programmable fuses in the chipset 206 greatly increases the efficiency of the manufacturing process.

In some embodiments, the fuse configuration profiles 306a-c may be provided in the BIOS storage 204b/300 along with references, pointers, and/or other indicators for the computing device configuration (e.g., the PCH/CPU combination) for which they have been defined, and at block 404 the BIOS 204 in the BIOS 204 may select one of the fuse configuration profiles 306*a-c* by using the PCH/CPU combination determined to block 402 to identify the matching indicator/fuse configuration profile. However, while a particular computing device configuration (e.g., PCH/CPU combination) has been described, one of skill in the art in possession of the present disclosure will recognize that other computing device configurations (e.g., PCH type only, CPU type only, PCH type/other configuration detail combinations, CPU type/other configuration detail combinations, other configuration details, or other configuration detail combinations) may be utilized in selecting a fuse configuration profile to block 404 while remaining within the scope of the present disclosure. Furthermore, a variety of conditional equations may be built into block 402 of the method 400 in order to determine the fuse configuration profile, and may consider features such as the Authenticated Code Module (ACM) version, platform identifier information, platform personality information, system profile information, system configuration information, license information, and/or a variety of other feature characteristics that would be apparent to one of skill in the art in possession of the present disclosure.

In some embodiments of block 404, the BIOS 204 may determine whether the first fuse configuration profile region 308*a* includes a fuse configuration profile that was determined at block 404 as corresponding to the PCH/CPU combination included in the computing device 200. As discussed above, the management engine 204*a* may be configured to utilize any fuse configuration profile that is located in the first fuse configuration profile region 308*a* of the BIOS storage 204*b*/300 for programming of the programmable fuses 206*a* in the chipset 206, and thus the selection of a fuse configuration profile at block 404 may include ensuring that the correct fuse configuration profile (i.e., the fuse configuration profile determined at block 404 to be appropriate for the PCH/CPU combination in the computing device 200) is provided in the first fuse configuration profile region 308*a*. As such, in one example, the first fuse configuration profile 306*a* located in the first fuse configuration profile region 308*a* may be the fuse configuration profile determined at block 404 as corresponding to the PCH/CPU combination in the computing device 200, and the BIOS 204 thus does not need to perform any modifications to the first fuse configuration profile region 308*a* of the BIOS storage 204*b*/300.

Figure 5:
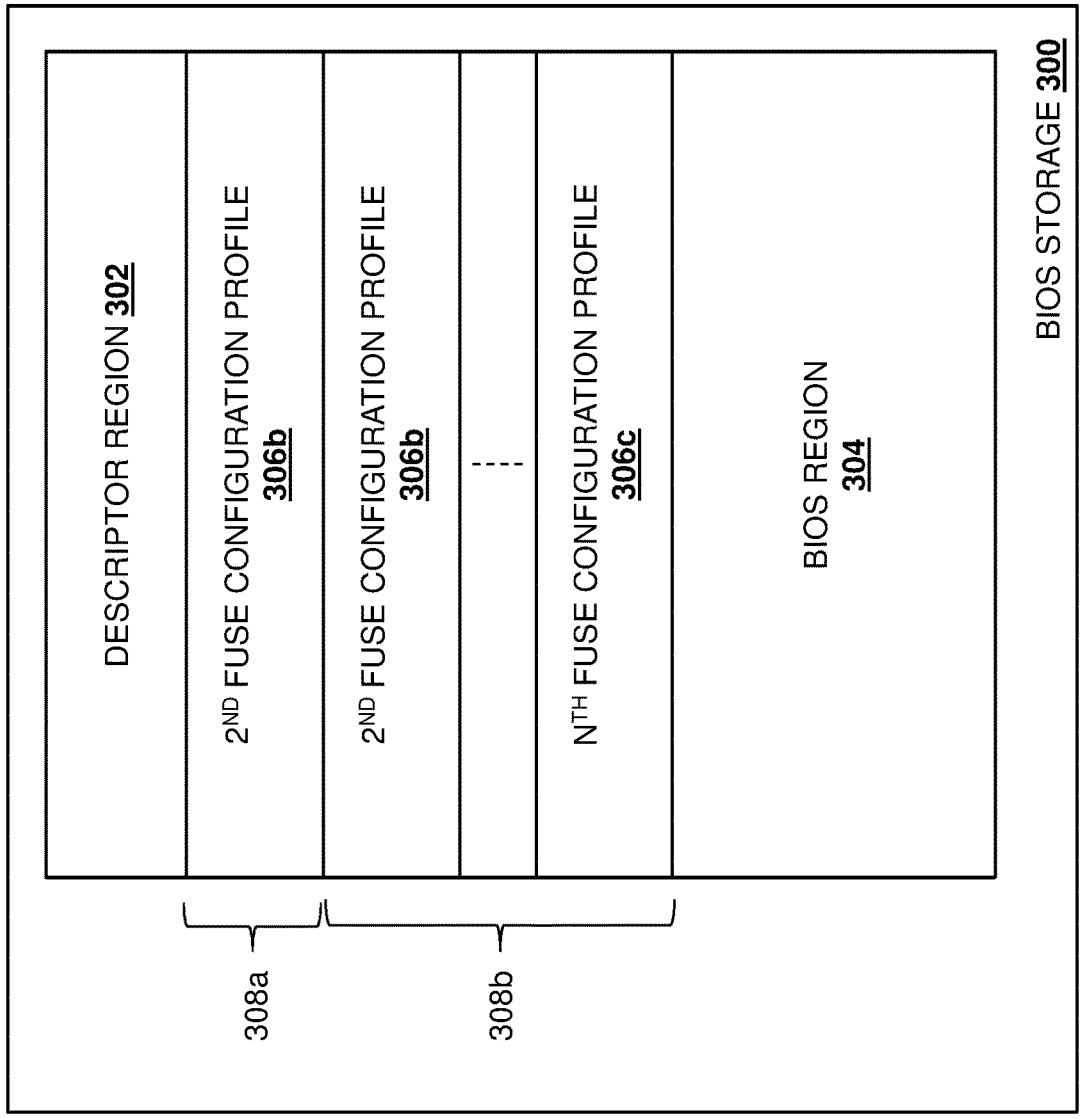
FIG. 5 is a schematic view illustrating an embodiment of the BIOS storage of FIG. 3 following selection of a non-default fuse configuration profile.

However, in another example, one of the second fuse configuration profile 306*a* and up to the Nth fuse configuration profile 306*c* in the second fuse configuration profile region 308*b* of the BIOS storage 204*a*/300 may be the fuse configuration profile determined at block 404 as corresponding to the PCH/CPU combination in the computing device 200. In such examples, the BIOS 204 may determine whether runtime EOM is supported by the computing device 200 and, if not, the method 400 may end. However, as long as runtime EOM is supported by the computing device 200, the BIOS 204 may then erase the first fuse configuration profile 306*a* from the first fuse configuration profile region 308*a* of the BIOS storage 204*b*/300, and write the selected fuse configuration profile (e.g., the second fuse configuration profile 306*b*) to the first fuse configuration profile region 308*a*. As such, with reference to FIG. 5, following block 404 the appropriate fuse configuration profile for the PCH/CPU combination in the computing device is located in the first fuse configuration profile region 308*a* of the BIOS storage 204*b*/300.

The method then proceeds to block 406 where the BIOS programs chipset fuses using the first fuse configuration profile. In an embodiment, at block 406, the management engine 204*a* in the BIOS 204 operates to program the programmable fuses 206*a* in the chipset 206 using the fuse configuration profile determined at block 404. For example, at block 406, the BIOS 204 may cause the computing device to reset, reboot, or otherwise initialize (e.g., via a cold reset), which may ensure that the fuse configuration profile located in the first fuse configuration profile region 308*a* of the BIOS storage 204*b*/300 is configured for use (e.g., "latched") upon the subsequent boot of the computing device 200. While not illustrated, one of skill in the art in possession of the present disclosure will recognize that any errors occurring prior to this reset (e.g., at blocks 402, 404, and/or 406 of the method 400) may cause the method 400 and computing device operation to halt, the method 400 to end, and an error to be displayed on a display screen included on the computing device 200.

In a specific example, following the initialization of the computing device 200 and the completion of POST, the BIOS 204 may perform a BIOS runtime EOM function that checks the configuration of the computing device 200 (e.g., the PCH type of the PCH, the CPU type of the CPU, and/or other configuration details), and that ensures that runtime EOM functions are supported by the computing device/platform. For example, the BIOS 204 may verify that the PCH is either a production or pre-production PCH type, and that the CPU is either a production or pre-production CPU type and, if so, verify that runtime EOM is supported on the computing device 200. If the PCH type of the PCH, the CPU type of the CPU, or runtime EOM are not supported by the computing device 200, the method 400 may end. If the PCH type of the PCH, the CPU type of the CPU, and runtime EOM are supported by the computing device 200, the BIOS 204 then determines whether the management engine is 204*a* ready and operational. If the management engine 204*a* is determined to not be in an operational state, the BIOS 204 may operate to reset the management engine 204*a* (e.g., some predetermined number of times) until it is either in the operational state, or it remains in the non-operational state such that the method 400 ends.

When the management engine 204*a* is determined to be in the operational state, the BIOS 204 may then verify that the computing device 200 is in a manufacturing mode, that the fuse configuration profile located in the first fuse configuration profile region 308*a* is the appropriate fuse configuration profile for the PCH/CPU combination included in the computing device 200, and that the PCH/CPU combination is supported for EOM. With that verification, the BIOS 204 then provides the management engine 204*a* an EOM HECI command that causes the management engine 204*a* to configure (e.g., burn, blow, or otherwise program) the programmable fuses 206*a* in the chipset/PCH 206 with the value defined by the fuse configuration profile that is located in the first fuse configuration profile region 308*a*. If the PCH/CPU combination is not supported or the EOM HECI command fails, BIOS execution is halted and an error message is displayed.

When the programming of the programmable fuses 206*a* is completed, the BIOS 204 determines that the manufacturing flow has been completed and verifies that the programmable fuses 206*a* have been configured to the expected values. As such, the programmable fuses 206*a* may be programmed to include security information provided in the chipset 206 such as a public key or hash thereof, which may be utilized to verify software or firmware that has been signed with an associated private key. Similarly, the programmable fuses 206a may be programmed to enable features in the computing device 200 such as, for example, BOOT GUARD available in systems provided by DELL® Inc. of Round Rock, Tex., United States, PLATFORM TRUST TECHNOLOGY available from INTEL® corporation of Santa Clara, Calif., United States, as well as Innovation Engine (an INTEL® processor embedded into the PCH for Outside Equipment Manufacturers (OEMs) to run cryptographically signed OEM firmware for applications such as platform management functions similar to the INTEL® management engine, offloading BIOS routines, etc.), flash descriptor verification, and/or other features known in the art.

Thus, systems and methods have been described that provide for the programming of chipset fuses based on the detection of, and differentiation between, computing device configurations (e.g., combinations of chipset types and CPU types), which prevents the disablement or bricking of computing devices that can occur when chipset fuses are burnt according to a fuse configuration profile that is not appropriate for the computing device configuration. The systems and methods of the present disclosure provide BIOS-based control of the EOM process that is automated, and allow for a single version of the BIOS image to be utilized with a variety of computing devices having different configurations (e.g., different combinations of chipset types and CPU types), eliminating the need for the multiple different BIOS versions required for conventional chipset fuse programming systems, while reducing or eliminating human errors produced in (and human intervention required for) the EOM process. This is enabled, at least in part, by including different fuse configuration profiles in the BIOS image that correspond to different possible configurations of the computing device. Furthermore, build time control of the EOM process may be enabled for specific computing device platforms and disabled for other computing device platforms. As such, the systems and methods of the present disclosure may be utilized to reduce production costs, reduce manufacturing times, ease the supply chain, and increase the efficiency of the manufacturing process.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A chipset fuse programming system, comprising:
   a chassis;
   a chipset that is located in the chassis and that includes a plurality of programmable fuses; and
   a Basic Input/Output System (BIOS) that is located in the chassis and coupled to the chipset, wherein the BIOS includes a BIOS storage including a plurality of fuse configuration profiles, and wherein the BIOS is configured to:
   determine a chipset type of the chipset;
   select, based on the chipset type of the chipset, a first fuse configuration profile of the plurality of fuse configuration profiles; and
   program, using the first fuse configuration profile, the plurality of programmable fuses included in the chipset.

2. The system of claim 1, wherein the chipset type is one of a pre-production chipset type and a production chipset type.

3. The system of claim 1, further comprising:
   a central processing system that is located in the chassis and coupled to the BIOS, wherein the BIOS is configured to:
   determine a central processing system type of the central processing system; and
   select the first fuse configuration profile based on a combination of the chipset type of the chipset and the central processing system type of the central processing system.

4. The system of claim 3, wherein the central processing system type is one of a pre-production central processing system type and a production central processing system type.

5. The system of claim 1, wherein the plurality of fuse configuration profiles include a default fuse configuration profile, and wherein the selecting the first fuse configuration profile and using the first fuse configuration profile to program the plurality of programmable fuses includes:
   erasing the default fuse configuration profile from a first region of the BIOS storage; and
   writing the first fuse configuration profile to the first region of the BIOS storage.

6. The system of claim 1, wherein the first fuse configuration profile provides for the programming of the programmable fuses such that the chipset includes at least one of:
   public key information; and
   feature information for enabling at least one computing device feature.

7. An Information Handling System (IHS), comprising:
   a processing subsystem; and
   a memory subsystem that is coupled to the processing subsystem and that includes instructions that, when executed by the processing subsystem, causes the processing subsystem to provide a Basic Input/Output System (BIOS) that is configured to:
   determine a chipset type of a chipset that is coupled to the BIOS;
   select, based on the chipset type of the chipset, a first fuse configuration profile of a plurality of fuse configuration profiles that are included in a BIOS storage; and
   program, using the first fuse configuration profile, a plurality of programmable fuses that are included in the chipset.

8. The IHS of claim 7, wherein the chipset type is one of a pre-production chipset type and a production chipset type.

9. The IHS of claim 7, wherein the BIOS is configured to:
   determine a central processing system type of a central processing system that is coupled to the BIOS; and
   select the first fuse configuration profile based on a combination of the chipset type of the chipset and the central processing system type of the central processing system.

10. The IHS of claim 9, wherein the central processing system type is one of a pre-production central processing system type and a production central processing system type.

11. The IHS of claim 7, wherein the plurality of fuse configuration profiles include a default fuse configuration profile, and wherein the selecting the first fuse configuration profile and using the first fuse configuration profile to program the plurality of programmable fuses includes:
  erasing the default fuse configuration profile from a first region of the BIOS storage; and
  writing the first fuse configuration profile to the first region of the BIOS storage.

12. The IHS of claim 11, wherein the BIOS is configured to:
  cause a reset of the IHS following the writing of the first fuse configuration profile to the first region of the BIOS storage, wherein the programming of the plurality of programmable fuses using the first fuse configuration profile is performed following the reset.

13. The IHS of claim 7, wherein the first fuse configuration profile provides for the programming of the programmable fuses such that the chipset includes at least one of:
  public key information; and
  feature information for enabling at least one IHS feature.

14. A method for programming chipset fuses, comprising:
  determining, by a Basic Input/Output System (BIOS), a chipset type of a chipset that is coupled to the BIOS;
  selecting, by the BIOS based on the chipset type of the chipset, a first fuse configuration profile of a plurality of fuse configuration profiles that are included in a BIOS storage; and
  programming, by the BIOS using the first fuse configuration profile, a plurality of programmable fuses that are included in the chipset.

15. The method of claim 14, wherein the chipset type is one of a pre-production chipset type and a production chipset type.

16. The method of claim 14, further comprising:
  determining, by the BIOS, a central processing system type of a central processing system that is coupled to the BIOS; and
  selecting, by the BIOS, the first fuse configuration profile based on a combination of the chipset type of the chipset and the central processing system type of the central processing system.

17. The method of claim 16, wherein the central processing system type is one of a pre-production central processing system type and a production central processing system type.

18. The method of claim 14, wherein the plurality of fuse configuration profiles include a default fuse configuration profile, and wherein the selecting the first fuse configuration profile and using the first fuse configuration profile to program the plurality of programmable fuses includes:
  erasing the default fuse configuration profile from a first region of the BIOS storage; and
  writing the first fuse configuration profile to the first region of the BIOS storage.

19. The method of claim 18, further comprising:
  causing, by the BIOS, a reset of a computing device that includes the BIOS following the writing of the first fuse configuration profile to the first region of the BIOS storage, wherein the programming of the plurality of programmable fuses using the first fuse configuration profile is performed following the reset.

20. The method of claim 14, wherein the first fuse configuration profile provides for the programming of the programmable fuses such that the chipset includes at least one of:
  public key information; and
  feature information for enabling at least one feature in a computing device that includes the BIOS.

* * * * *